United States Patent [19]

Askman et al.

[11] Patent Number: 5,660,102
[45] Date of Patent: Aug. 26, 1997

[54] APPARATUS FOR PREPARING A TUBULAR PRODUCT CONTAINING A FILLING

[75] Inventors: Lars Askman, Billesholm; Werner Leonhardt, Astorp; Ingemar Svahn, Odakra, all of Sweden

[73] Assignee: Nestec S.A., Vevey, Sweden

[21] Appl. No.: 540,044

[22] Filed: Oct. 6, 1995

Related U.S. Application Data

[62] Division of Ser. No. 270,938, Jul. 5, 1994, Pat. No. 5,487,905.

[30] Foreign Application Priority Data

Jul. 13, 1993 [EP] European Pat. Off. ............ 93111161

[51] Int. Cl.⁶ .......................... A21C 9/04; A21C 9/06; A23L 1/16; A23P 1/00
[52] U.S. Cl. .............. 99/450.6; 99/450.1; 99/450.7
[58] Field of Search .............. 99/353–355, 450.1, 99/450.8; 198/824; 425/112, 363, 391, 133.1; 426/138, 283, 284, 496, 502, 503, 512, 514, 518, 517

[56] References Cited

U.S. PATENT DOCUMENTS

| | | | |
|---|---|---|---|
| 3,669,007 | 6/1972 | Pulici | 426/297 |
| 3,869,238 | 3/1975 | Racca | 425/294 |
| 4,084,493 | 4/1978 | Quintana | 426/297 |
| 4,418,085 | 11/1983 | Becquelet | 426/297 |
| 4,515,817 | 5/1985 | Pavan | 99/353 |
| 4,597,976 | 7/1986 | Doster et al. | 426/325 |
| 4,604,947 | 8/1986 | Pavan | 99/353 |
| 4,778,685 | 10/1988 | Simelunas et al. | 426/297 |
| 4,876,104 | 10/1989 | McGuire et al. | 426/557 |
| 4,898,744 | 2/1990 | Liggett et al. | 426/557 |
| 4,992,285 | 2/1991 | Larsen | 426/297 |
| 5,290,577 | 3/1994 | Tashiro | 426/383 |
| 5,330,776 | 7/1994 | Wikstroem | 198/839 |

FOREIGN PATENT DOCUMENTS

| | | |
|---|---|---|
| 1440770 | 4/1966 | France . |
| 1450383 | 7/1966 | France . |
| 2649591 | 1/1991 | France . |
| 1037870 | 8/1966 | United Kingdom . |

*Primary Examiner*—Timothy F. Simone
*Attorney, Agent, or Firm*—Vogt & O'Donnell, LLP

[57] ABSTRACT

An apparatus for forming a product strip about a filling material, such as a tubular filled pasta product and particularly cannelloni, has a roller positioned for forming a strip of material, such as a pasta strip, when the strip is transported longitudinally and contacted by the roller, into a curved strip having a curved interior area, and a conveyor belt is positioned to transport the curved strip from the roller to a filling deposit member for deposit of a filling within the curved strip interior area and then to a ring member positioned for passage of the curved strip containing the filling therethrough for forming the curved strip into a tube about the filling for enclosing the filling within the tube.

20 Claims, 3 Drawing Sheets

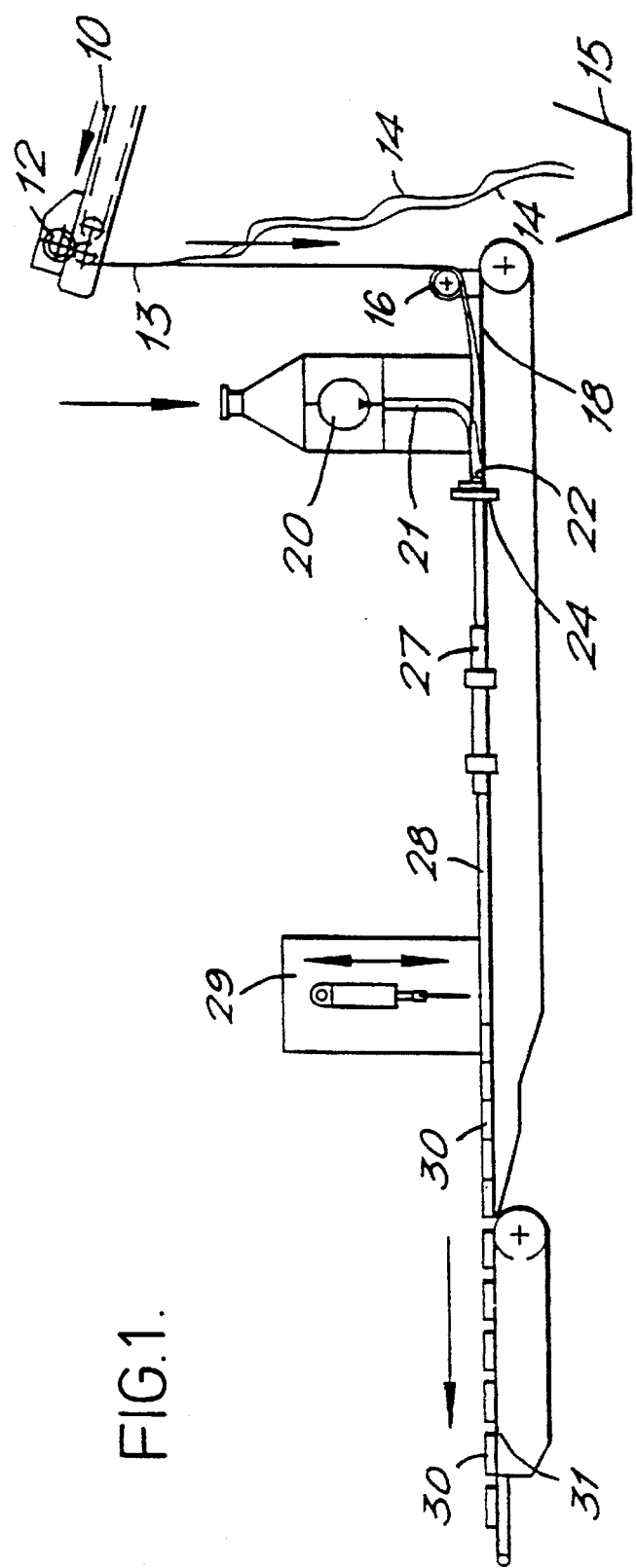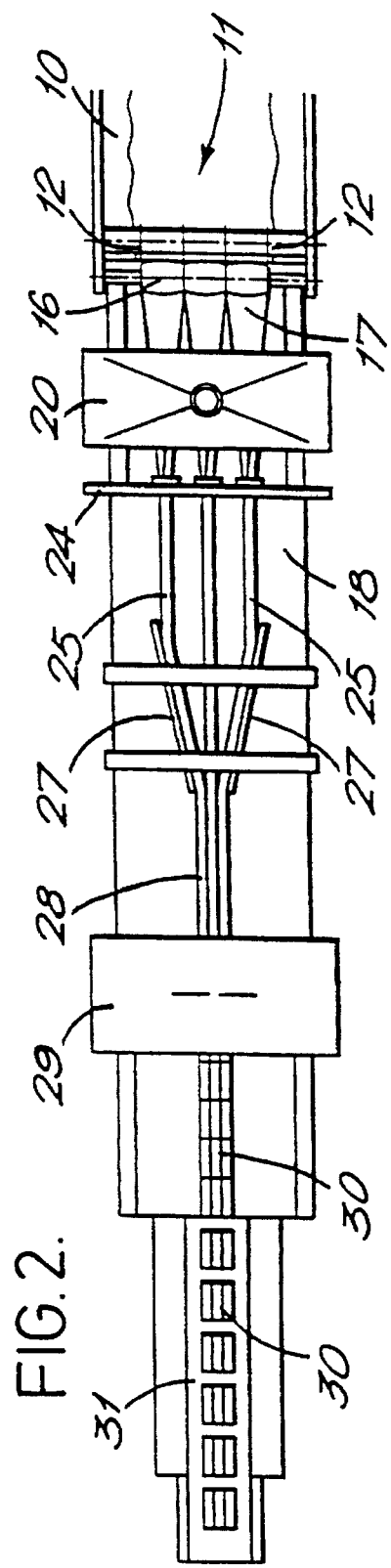
FIG.1.
FIG.2.

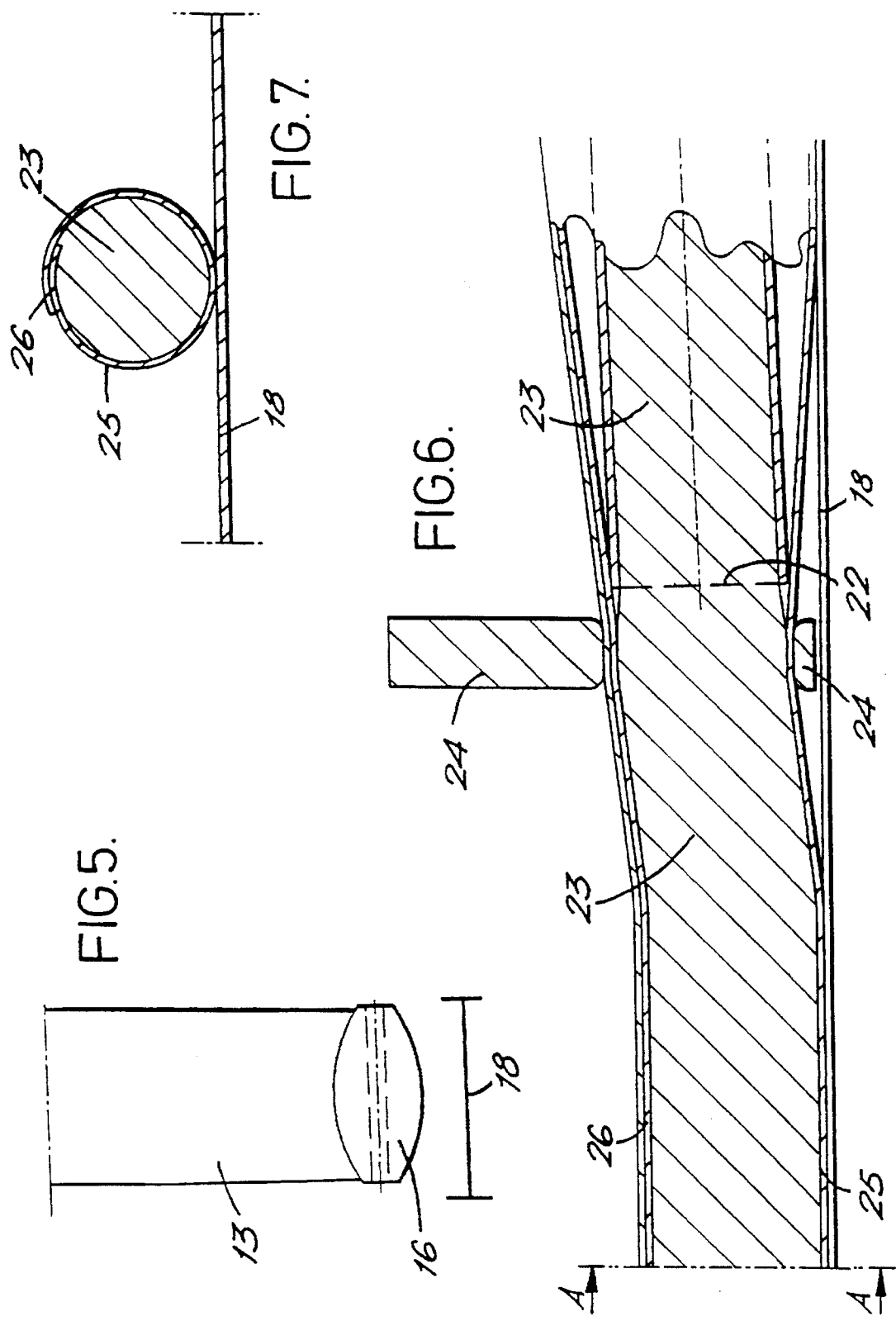

APPARATUS FOR PREPARING A TUBULAR PRODUCT CONTAINING A FILLING

CROSS-REFERENCE TO RELATED APPLICATION

This is a divisional application of application Ser. No. 08/270,938 filed Jul. 5, 1994, now U.S. Pat. No. 5,487,905.

BACKGROUND OF THE INVENTION

The present invention relates to means for forming product strips into a tubular form about a filling material and particularly for forming pasta strips about a filling material for, in particular, production of cannelloni.

Cannelloni is traditionally made manually in separate steps. However, not only is the pasta usually very sticky and slippery to handle, the process is extremely time and labour consuming.

SUMMARY OF THE INVENTION

The present invention provides an apparatus for preparing a tubular product, such as a tubular filled pasta product, particularly cannelloni, which includes an aligned assembly of a preforming device for forming a strip into a curved strip, means for depositing a filling onto the curved strip and means for forming the curved strip containing the filling into a tube, and a conveyor is positioned for transporting the curved strip from the preforming device to the filling deposit means and then to tube forming means. More particularly, the preforming device of the present invention is a roller having a curved surface positioned for, upon contacting a longitudinally extending strip transported past the roller longitudinally, forming the curved strip so that in cross-section, the curved strip has an upper surface having a concave shape which defines a curved strip interior area, and the tube forming means is a ring member positioned for receiving the curved strip containing the filling from the conveyor for passage therethrough for forming the curved strip into a tube about the filling for enclosing the filling within the tube.

The present invention also provides for forming a plurality of tubes simultaneously, and in accord therewith, a plurality of each of the preforming device, filling deposit means and tube-forming means are aligned side-by-side for forming, simultaneously, a plurality of curved strips, of curved containing filling strips and of tubes aligned side-by-side, and the conveyor is suitable for transporting the plurality of curved strips and tubes. In addition, a cutting means is provided for cutting a strand into the plurality of strips which are formed into the curved strips by the preforming devices, and an additional conveyor belt provides for transporting the strand to the cutting means.

DETAILED DESCRIPTION OF THE INVENTION

We have now deviced an automatic mechanical process which obviates the above disadvantages.

Accordingly, the present invention provides a process for the continuous production of cannelloni which comprises
  a. forming a blanched, pasta strand,
  b. cutting the blanched, pasta strand longitudinally into a plurality of strips lying side by side,
  c. preforming the strips into curved strips by training the strips around preforming devices shaped to cause the longitudinal edges of the strips to pass out of the plane of the longitudinal axis of the strips.
  d. passing the curved strips with their concave surfaces facing upwards onto a cannelloni-forming conveyor belt,
  e. transporting the curved strips downstream on the cannelloni-forming conveyor belt and depositing a filling onto the curved strips simultaneously while forming the curved strips into closed tubes each having an overlap seam. In accord with the present invention, for forming cannelloni, a blanched pasta strand may be formed by any conventional method, e.g. where the pasta dough is extruded from a kneader/sheeter to give a strand which is passed onto a conveyor belt which transports the strand through a blanching tank containing hot water and then out of the blanching tank onto a cooling conveyor. The width of the blanched, cooled pasta strand may be any suitable width depending upon the final shape of the cannelloni.

Advantageously, the blanched pasta strand is transported on a conveyor belt, which may conveniently be a cooling conveyor belt, above which are positioned one or more cutting devices, e.g. rotating circular knives, adapted to cut the pasta strand longitudinally into a plurality of strips lying side by side. The maximum number of strips is unlimited depending upon the diameter of the cannelloni and the available width of pasta strand before cutting. However, the usual number of strips in 4, 5 or 6.

Each of the strips is then trained around a separate preforming device, e.g. a preforming roller, to form the curved strips. Each preforming roller is advantageously convex-shaped whereby its circumference is convex along its longitudinal surface so that the diameter increases to a maximum at approximately the mid-point between the two sides of the roller. The preforming rollers are conveniently arranged side by side in a row and are preferably positioned at or above the upstream end of the cannelloni-forming conveyor belt. The pasta strips are preferably trained around and beneath the preforming rollers so that they pass onto a conveyor belt with their upper surfaces forming, in cross-section, a concave shape which defines a curved strip interior area.

It is also possible for the preforming roller to be concave shaped whereby its circumference is concave along its longitudinal surface so that the diameter is at minimum at approximately the mid-point between the two sides of the roller. In this case, the pasta strips are preferably trained around and above the preforming rollers so that they pass onto a conveyor belt with their concave surfaces upwards. Advantageously, means are provided for holding down the pasta strip onto the concave surface of the roller.

The filling is conveniently deposited onto the curved strips from a filling nozzle whose opening is preferably positioned immediately upstream of the position where the curved strips are formed into closed tubes. The filling nozzle is conveniently attached to a filling pump and preferably is bent so that the end part provided with the opening lies substantially parallel to and within the curved strip.

Immediately after blanching, the pasta strands are slippery and before forming into closed tubes, it is desirable to make the surface of the strands or the strips sticky, e.g. by cooling. The maximum temperature depends on the type of pasta but usually the pasta should be cooled to below 80° C., preferably below 60° C. and more preferably below 40° C.

The means for forming each of the curved strips into a closed tube is conveniently provided by a forming ring positioned just above a conveyor belt with its circumferential plane transverse to the direction of the travel of the belt. Each of the curved strips is raised above the conveyor belt and passed through the forming ring to form the closed tube after which the closed tube is again supported by the conveyor belt. Each closed tube is formed with an upper overlap seam, the width of which depends on the stickiness of the pasta and the stiffness of the filling. The width of the overlap may be as much as the diameter of the cannelloni but is usually from 30 to 60% of the diameter of the cannelloni. The width may be less than 30% of the diameter of the cannelloni provided the two surfaces of the overlap seam stick together.

Advantageously, the filling is deposited from the filling nozzle simultaneously with the tubular formed pasta being passed through the forming ring.

After passing through the forming ring, the tubular pasta enclosing the filling, shaped like a continuous cannelloni, is prevented from falling apart by the stickiness of the pasta in the overlap seam and the high viscosity and stickiness of the filling. The tubular pastas, which are spaced from one another on the conveyor belt are then conveniently impelled into contact with the adjacent pastas by any suitable means, e.g. a plough, and afterwards cut into the final cannelloni products, e.g. by passing beneath a guillotine knife.

The present invention is illustrated further by way of example with reference to the accompanying drawings.

BRIEF DESCRIPTION OF THE DRAWINGS

FIG. 1 illustrates a side plan view of an apparatus according to the invention.

FIG. 2 illustrates a top plan view of the apparatus of FIG. 1.

FIG. 5 illustrates a sectional view along the line C—C of FIG. 3 viewed in the direction of the arrows.

FIG. 6 illustrates a side view of a forming ring and a filling nozzle.

FIG. 7 illustrates a sectional view along the line A—A of FIG. 6 viewed in the direction of the arrows.

DETAILED DESCRIPTION OF THE DRAWINGS

Figure 3:
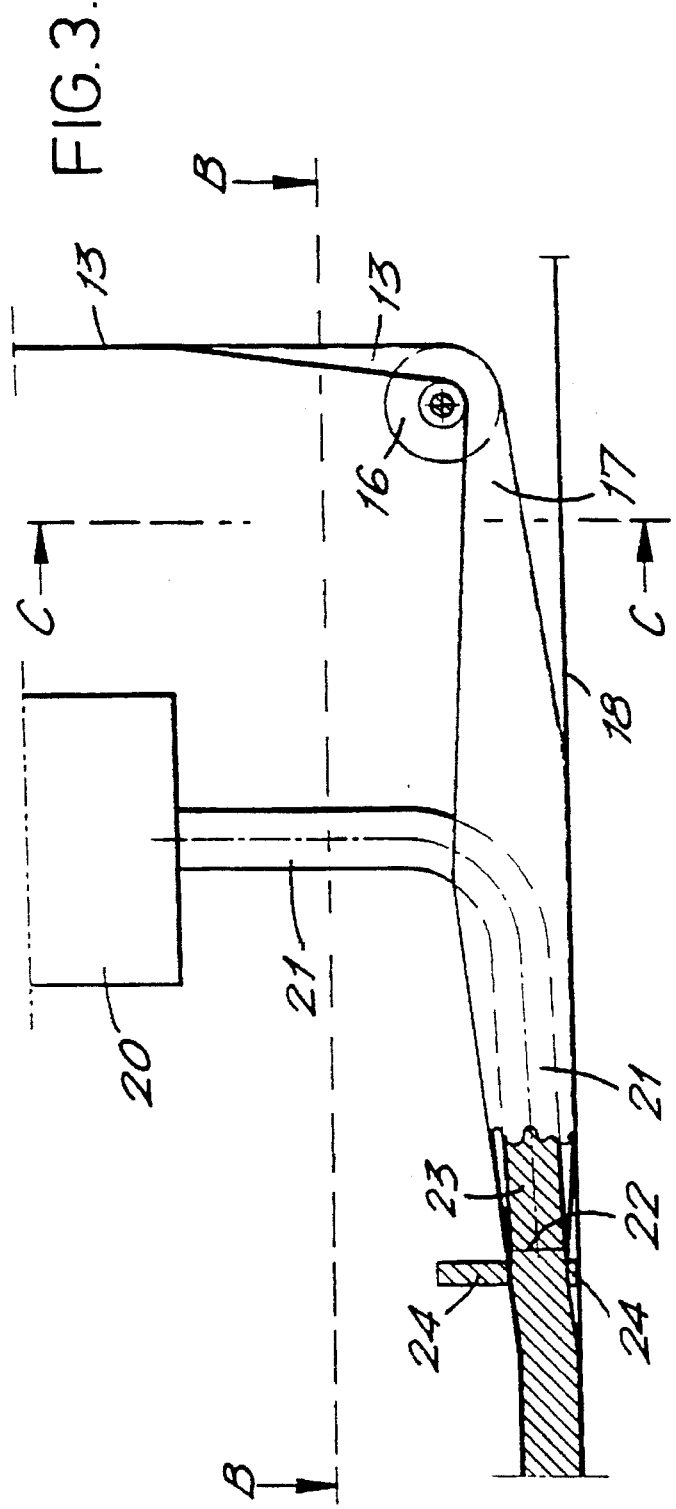
FIG. 3 illustrates a side plan view of part of the apparatus of FIG. 1 showing more detail.

Referring to the drawings, as illustrated in FIGS. 1 and 2, the machine comprises a cooling conveyor 10 transporting a blanched, cooled pasta strand 11, having a width of 30 cm.

Positioned above the cooling conveyor 10 at its downstream end are four rotating circular knives 12 for cutting the pasta strand 11 longitudinally into three central strips 13 and two scrap strips 14 one from each edge of the strand 11 which fall into a container 15.

Figure 4:
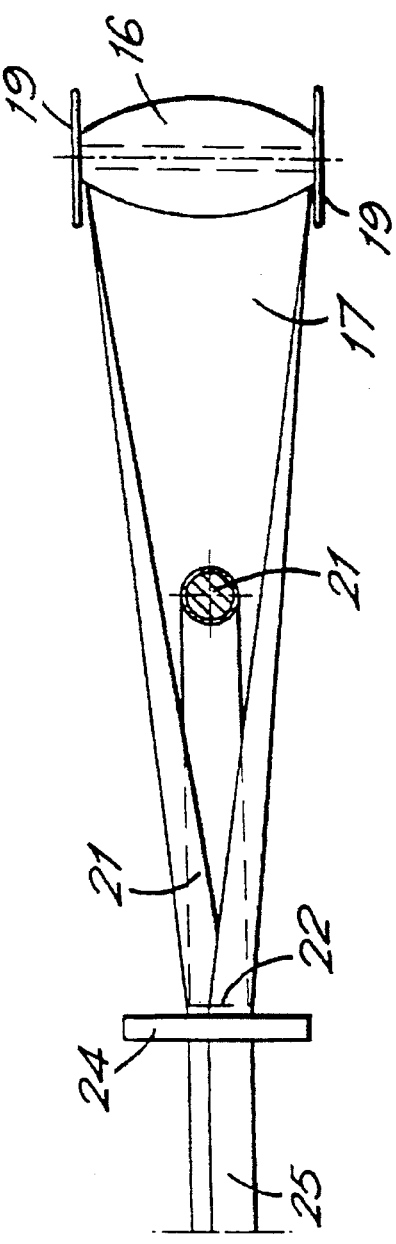
FIG. 4 illustrates a sectional view along the line B—B of FIG. 3 viewed in the direction of the arrows.

Three convex preforming rollers 16, around which the central strips 13 may be trained to form curved strips 17, are positioned above the upstream end of a conveyor belt 18. (See also FIG. 5). As illustrated in FIG. 4, the preforming rollers 16 are provided with side guides 19. Downstream of the preforming rollers 16 is a filling pump 20 fitted with three filling nozzles 21, each having an opening 22 containing filling 23 (FIG. 3), and downstream of the filling nozzles are three forming rings 24 for forming closed tubes 25 each having an overlap seam 26 from the curved strips 17 (see also FIGS. 6 and 7).

As also illustrated in FIGS. 1 and 2, a pair of ploughs 27 is provided for guiding the three closed tubes 25 into contact with each other to form a continuous cannelloni strip 28 above which is a guillotine cutter 29 for cutting the strip 28 into individual cannelloni pieces 30. Beyond the downstream end of the conveyor belt 18 is an acceleration belt 31.

In operation, the blanched, cooled pasta strand 11 is cut longitudinally by the knives 12 into three central strips 13 from which the cannelloni is made and two scrap strips 14 from the edges which fall into the container 15. The pasta strips 13 are trained around the convex preforming rollers 16 which cause the longitudinal edges of the strips to bend to form curved strips 17 which are transported on the conveyor belt 18 to the filling pump 20. Each filling nozzle 21 is bent so that the end part lies parallel to the conveyor belt partially surrounded by the sides of the curved strips 17. The opening 22 of each filling nozzle is positioned just upstream of each final forming ring 24 and the curved strips 17 are raised above the conveyor belt 18 as they are transported to pass through the forming rings where they are formed into closed tubes 25 while simultaneously the filling 23 deposited is issued into the concave upper surface interior area of the curved strips 17 from the openings 22 of the filling nozzles 21 in a direction of transport of the strips (FIGS. 3, 4 and 6) form three closed tubes 25 each with an overlap seam 26 having a width half the diameter of the cannelloni and containing filling 23.

The closed tubes are transported past the ploughs 27 where they are guided to contact one another and form a continuous cannelloni strip 28 which is then cut by the guillotine cutter 29 into individual cannelloni pieces 30. The cannelloni pieces 30 are then transferred from the downstream end of the conveyor belt 18 onto an accelerator belt 31 which separates the pieces 30 from one another for further processing.

The whole process is electronically controlled by a computer.

We claim:

1. An apparatus for preparing a tubular product comprising an assembly comprising:

a roller having a curved surface configured for, upon contacting a longitudinally extending strip transported past the roller longitudinally, forming a curved strip so that in cross-section, the curved strip formed has an upper surface having a concave shape which defines a curved strip interior area;

a conveyor belt positioned for transporting the curved strip away from the roller;

means aligned with the roller and conveyor belt and positioned for depositing a filling from above the conveyor belt to within the curved strip interior area for obtaining a curbed strip containing the filling; and a ring member aligned with the roller, conveyor belt and filling deposit means positioned above the conveyor belt for receiving the curved strip containing filling from the conveyor belt for passage therethrough for forming the curved strip into a tube about the filling for enclosing the filling within the tube.

2. An apparatus according to claim 1 further comprising an additional conveyor belt for transporting a longitudinally extending strand and further comprising a cutting means for cutting the strand to obtain the longitudinally extending strip wherein the additional conveyor belt and cutting means are aligned and positioned so that the additional conveyor belt transports the strand to the cutting means for cutting the strand longitudinally and transports the longitudinally extending strip to the assembly so that the longitudinally extending strip is trained against the roller for being formed into a curved strip.

3. An apparatus according to claim 2 wherein the cutting means is suitable for cutting the strand into a plurality of strips and wherein, with respect to each strip, there is one assembly comprising the roller, filling deposit means and ring member for forming the curved strip, depositing filling and forming the tube.

4. An apparatus according to claim 3 wherein the assembly conveyor belt is suitable for transporting the plurality of curved strips and tubes.

5. An apparatus according to claim 1 further comprising means positioned for cutting the tube into a plurality of tubes.

6. An apparatus according to claim 1 wherein the filling deposit means is a nozzle having a portion which extends over a portion of the conveyor belt in a direction substantially parallel with the conveyor belt portion to an opening for issuing filling for deposit.

7. An apparatus according to claim 1 wherein the filling deposit means is positioned to deposit the filling at a position so that during filling deposit, the tube is being formed about the filling at the position of deposit.

8. An apparatus according to claim 7 wherein the filling deposit means is a nozzle having a portion which extends over a portion of the conveyor belt in a direction substantially parallel with the conveyor belt to an opening for issuing filling for deposit.

9. An apparatus according to claim 7 wherein the filling deposit means is configured so that the filling issues from the deposit means in a direction of transport of the curved strip.

10. An apparatus according to claim 7 where the nozzle opening is positioned and configured so that the filling issues from the deposit means in a direction of transport of the curved strip.

11. An apparatus according to claim 1 wherein the the roller curved surface has a convex shape.

12. An apparatus according to claim 1 wherein the the roller curved surface has a concave shape and further comprising means for holding the pasta strip down on the roller surface.

13. An apparatus according to claim 2 wherein the additional conveyor belt is a cooling conveyor belt for cooling the strand.

14. An apparatus according to claim 1 wherein the assembly comprises, aligned side-by-side, a plurality of the rollers, a plurality of the filling deposit means and a plurality of ring members for forming a plurality of aligned tubes and wherein the conveyor belt is suitable for transporting a plurality of curved strips and the tubes.

15. An apparatus according to claim 14 further comprising means for cutting the plurality of aligned tubes into a further plurality of tubes.

16. An apparatus according to claim 14 further comprising means positioned for converging a plurality of aligned tubes into aligned side-by-side contact.

17. An apparatus according to claim 16 further comprising means positioned for cutting the converged tubes to form a plurality of converged tubes.

18. An apparatus according to claim 14 further comprising an additional conveyor belt for transporting a longitudinally extending pasta strand and further comprising a cutting means for cutting the transported strand into a plurality of strips wherein the additional conveyor belt and cutting means are positioned for transport of the strand to the cutting means and of the strips to the assembly so that the transported strips are trained against the plurality of rollers in a one-to-one strip and roller relation for forming the curved strips.

19. An apparatus according to claim 15 further comprising an additional conveyor belt for transporting a longitudinally extending pasta strand and further comprising a cutting means for cutting the transported strand into a plurality of strips wherein the additional conveyor belt and cutting means are positioned for transport of the strand to the cutting means and of the strips to the assembly so that the transported strips are trained against the plurality of rollers in a one-to-one strip and roller relation for forming the curved strips.

20. An apparatus according to claim 16 further comprising an additional conveyor belt for transporting a longitudinally extending pasta strand and further comprising a cutting means for cutting the transported strand into a plurality of strips wherein the additional conveyor belt and cutting means are positioned for transport of the strand to the cutting means and of the strips to the assembly so that the transported strips are trained against the plurality of rollers in a one-to-one strip and roller relation for forming the curved strips.

* * * * *